Patented May 1, 1945

2,375,078

UNITED STATES PATENT OFFICE 2,375,078

PREPARATION OF VITAMIN E OR TOCOPHEROLS

John D. Cawley, Rochester, N. Y., assignor to Distillation Products, Inc., Rochester, N. Y., a corporation of Delaware No Drawing. Application February 25, 1941, Serial No. 380,517

2 Claims. (Cl. 167—81)

Tocopherols are known to exist in three different forms, namely, alpha, beta, and gamma, all of which have vitamin E activity. My invention relates to the preparation of purified substances having vitamin E activity and containing one or more of these tocopherols.

When a vegetable or animal oil or a product derived therefrom such as crude fatty acids obtained by the acidulation of refinery foots or soap stock is subjected to treatment with inert gas or steam, a scum or sludge-like product can be condensed from the inert gas or steam. This product is obtained in large amounts during the deodorization of vegetable or animal oils with steam. A common method of separating this material is to place a trap or partial condenser in the line between the vegetable or animal oil treating tank and the condenser or rectifier for the inert gas or steam. Also it may be obtained by condensing the steam and separating the material from the condensate by filtering or settling. The material may be removed as a scum from the surface of the condensed steam or by other methods. When vegetable or animal oils are treated with steam under vacuum, skimming the condensed water in the barometric leg or basin will yield this material. This scum or sludge has heretofore been a waste product and has been known by various names, such as deodorizer sludge, catch-all sludge, catch-all scum, deodorizer clabber stock, catch basin scum, etc. It is an exceedingly complex mixture, but contains a high percentage (usually 50–60%) of free fatty acids.

I have discovered that a concentrated tocopherol or vitamin E product can be obtained by subjecting the above described sludges, scums, or fractions thereof to a hydrogenation treatment. The hydrogenated product is then dissolved in a solvent and cooled to precipitate the associated substances insoluble in the solvent at low temperature. The solid matter is removed from the solvent and the solvent is then treated to remove the vitamin E therefrom. Although the starting material has a high content of free fatty acids, I have found that this procedure yields a product which is relatively free of these undesirable substances as well as the other impurities present in the original starting material. To obtain complete removal of free fatty acids, the mixture of solvent and hydrogenated scum should preferably be cooled to approximately —20° or less.

Hydrogenation of these scums can be accomplished by using methods well known in the prior art for hydrogenating organic substances. One satisfactory method is to mix the scum with a small amount of Raney nickel catalyst. The resulting mixture is agitated with gaseous hydrogen under a pressure of about 25 to 2000 pounds although smaller or greater pressures are satisfactory. A temperature of between about 20° and 250° is generally used. Temperatures of about 50–200° C. are most satisfactory. Other well known hydrogenation catalysts such as silver, platinum, palladium, nickel chromite, etc. may be used. The hydrogenation treatment is preferably continued until the hydrogen absorption is relatively slow or has stopped. This will require about ½ to four hours under the preferred operating conditions. However even slight hydrogenation causes partial insolubility of impurities in solvents and it is to be understood that such procedure is included within the scope of my invention.

The hydrogenated scum is then dissolved in a solvent in which it is soluble at one temperature but in which it is insoluble or partially insoluble at a lower temperature. Examples of suitable solvents are the alcohols melting at below about —20° C. such as methyl, ethyl, isopropyl, butyl, etc., and hydrocarbons such as petroleum ether, gasoline, kerosene, etc. Acetone is the most satisfactory solvent for most purposes. This mixture can then be filtered to remove catalyst but this step is not necessary. A solution of about 10 to 40% scum in the solvent is a useful range. The higher portion of this range is generally to be preferred. Lower or higher concentrations can be used.

The solvent-hydrogenated scum mixture is then cooled to separate the fatty acids and other impurities present in the scum. A temperature of approximately —15° C. or less, should be used since this results in a satisfactory removal of free fatty acids. Somewhat lower temperatures are preferred, such as —20° C. or less, since they result in substantially complete removal of the impurities. The solvent is then separated from the precipitated solid matter. This can be accomplished in a simple manner by filtration or decantation. The precipitate may be and preferably is, washed with additional solvent at low temperature and the washings combined with the solvent extract.

The solvent portion is then treated to obtain its vitamin E or tocopherol content. The most satisfactory method is to merely distill the solvent off at ordinary or reduced pressure. If a low boiling point solvent is used reduced pressure is unnecessary. If the solvent boils at above approximately 100° C. it would be best to distill it off under reduced pressure. The residue from the vaporization of the solvent constitutes a concentrated vitamin E product. The product may be further purified by vacuum distillation or saponification. If saponification is used the non-saponifiable is separated and may be further purified by vacuum distillation or chemical treatment. However, purification of the original residue obtained by separating solvent from the solids is unnecessary for most purposes for which vitamin E is employed.

Example I

Crude sludge, containing approximately 50% free fatty acid and 3.4% tocopherol, was hydrogenated at 100–110° and 50 lbs. initial pressure, using 5% Raney nickel, until the hydrogen uptake ceased (3 hours). Without further treatment, 137.5 g. were dissolved in 680 cc. of acetone (20% solution) and let stand at −35° C. overnight. The solids were then filtered off on a Buchner funnel at the same temperature and the precipitate washed with about 2 liters of acetone at −35° C. Filtrate and washing were combined and the acetone removed by distillation leaving 42.42 g. of brown oil containing 10.3% tocopherol. Tocopherol yield, 96%. A three fold increase in tocopherol concentration was effected.

Example II

Raw semisolid scum was removed from the hotwell of the barometric condenser of a vacuum steam deodorizer in which hydrogenated cottonseed oil was being deodorized. The scum was melted and intimately mixed with 5% by weight of HCl (36% strength), 1% zinc dust and ½% stannous chloride and the mixture heated and agitated at 40–50° C. by blowing steam therethrough. The mixture was settled overnight and the top liquid layer skimmed off and filtered. The filtrate was degassed at 150° C. and .5-mm. and then run in a thin film over the vaporizing column of a vacuum still in which the space between the vaporizing and condensing surfaces was unobstructed. A first fraction of 48% was removed at about 170° C. and 0.1-mm. and discarded. A second fraction of 29% was removed at about 200° C. and .001-mm. It had an acid value of 19.4 and contained 14.6% tocopherol. This fraction was mixed with 5% Raney nickel catalyst and heated at 100° with hydrogen under a pressure of 50 pounds. After four hours the mixture was removed and dissolved in acetone to make a 40% solution. This mixture was filtered to remove catalyst and then cooled to about −20° C. with a cooling bath containing a mixture of dry ice and acetone. The cold mixture was filtered after 2 hours of cooling and the solid precipitate was washed with fresh cold acetone which was then added to the filtrate. The acetone was then removed from the filtrate by distillation leaving a liquid residue of excellent purity and containing approximately 60% vitamin E.

The scum, as received from the refining or deodorizing plants frequently contains foreign bodies which may be removed by straining or filtering. Also it is usually in the form of an emulsion with water. The water can be removed before hydrogenation by heating, straining, centrifuging, etc., but this is not essential. The scum usually contains soaps formed from the fatty acids and the substances causing hardness in the water. It is advantageous, but not necessary to acidify to get rid of these soaps and break the emulsion usually present in the scum. It is to be understood that the term "scum" as used herein and in the appended claims includes the crude untreated materials as well as partial purification products, including distillates or fractions thereof.

What I claim is:

1. The process for preparing a vitamin E concentrate which comprises subjecting a crude scum which contains tocopherol and which is derived from the steam deodorization of a member of the group consisting of vegetable and animal fats to hydrogenation, dissolving the hydrogenated scum in a vitamin E solvent in which the hydrogenated scum is substantially soluble at a certain temperature but in which it is at least partially insoluble at a lower temperature, cooling this mixture to a temperature below approximately −15° to cause precipitation of at least the free fatty acid part of the scum, separating the liquid or solvent portion and subjecting it to a treatment to remove vitamin E therefrom.

2. The process for preparing a vitamin E concentrate which comprises subjecting a crude scum which contains tocopherol and which is derived from the steam deodorization of a member of the group consisting of vegetable and animal fats to hydrogenation, dissolving the hydrogenated scum in acetone to form a solution of between 10 and 40 per cent scum, cooling this mixture to a temperature below approximately −20° C. to cause precipitation of at least the free fatty acid part of the scum, separating the liquid acetone portion subjecting it to distillation to remove the acetone as a distillate and leaving vitamin E as a residue.

JOHN D. CAWLEY.

CERTIFICATE OF CORRECTION.

Patent No. 2,375,078. May 1, 1945.

JOHN D. CAWLEY.

It is hereby certified that error appears in the printed specification of the above numbered patent requiring correction as follows: Page 2, first column, line 49, Example II, for "0.1-mm." read --.01-mm.--; and that the said Letters Patent should be read with this correction therein that the same may conform to the record of the case in the Patent Office.

Signed and sealed this 31st day of July, A. D. 1945.

Leslie Frazer (Seal)   Acting Commissioner of Patents.